（12）United States Patent
Navarro et al.

(10) Patent No.: US 11,055,924 B2
(45) Date of Patent: Jul. 6, 2021

(54) SYSTEM AND METHOD FOR ACCESSING AND PROVIDING VEHICLE INFORMATION IN AUGMENTED REALITY

(71) Applicant: The Toronto-Dominion Bank, Toronto (CA)

(72) Inventors: Miguel Navarro, Ewing, NJ (US); Levi Sutter, Westampton, NJ (US); Mohamed Abbas, Jersey City, NJ (US); Mathew Hause, Collingswood, NJ (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/587,513

(22) Filed: Sep. 30, 2019

(65) Prior Publication Data

US 2021/0097283 A1    Apr. 1, 2021

(51) Int. Cl.
*G06T 19/00* (2011.01)
*G06K 9/00* (2006.01)

(52) U.S. Cl.
CPC ........ *G06T 19/006* (2013.01); *G06K 9/00671* (2013.01); *G06K 2209/23* (2013.01)

(58) Field of Classification Search
CPC .............. G06T 19/006; G06K 9/00671; G06K 2209/23
See application file for complete search history.

(56) References Cited

U.S. PATENT DOCUMENTS

| 9,922,356 | B1* | 3/2018 | Garcia, III | ......... G06Q 30/0609 |
| 10,332,208 | B1* | 6/2019 | Loo | .................. G06Q 30/06 |
| 10,535,201 | B1* | 1/2020 | Price | ................. G06T 19/006 |
| 2012/0271723 | A1 | 10/2012 | Penilla et al. | |
| 2013/0282542 | A1* | 10/2013 | White | .................. G06Q 40/00 705/35 |
| 2014/0257865 | A1 | 9/2014 | Gay et al. | |
| 2014/0279258 | A1* | 9/2014 | Swinson | ............ G06Q 30/0625 705/26.62 |
| 2015/0242926 | A1 | 8/2015 | Taira et al. | |
| 2016/0371788 | A1 | 12/2016 | Rackley, III et al. | |
| 2017/0161824 | A1* | 6/2017 | Ramos | .................. G06T 19/006 |

(Continued)

FOREIGN PATENT DOCUMENTS

WO    2017197444 A1    11/2017

*Primary Examiner* — William A Beutel
(74) *Attorney, Agent, or Firm* — Rowand LLP

(57) ABSTRACT

Computer systems and methods for accessing and presenting value characteristics of vehicles in augmented reality are disclosed. A method of accessing and presenting value characteristics in augmented reality includes capturing an image of a portion of an environment including at least a portion of a motor vehicle, and displaying an augmented reality version of the environment. Displaying the augmented reality version of the environment includes: identifying, based on the captured image, at least a make and model of the motor vehicle; obtaining, from one or more data stores based on the make and model, at least one value characteristic of the vehicle; and compositing a second image of a portion of the environment with an indication of the at least one value characteristic of the vehicle. Value characteristics of a vehicle may include insurance cost, finance cost, fuel cost and/or total cost of ownership.

20 Claims, 9 Drawing Sheets

(56) References Cited

U.S. PATENT DOCUMENTS

| | | |
|---|---|---|
| 2017/0287019 A1 | 10/2017 | Reid et al. |
| 2017/0345227 A1 | 11/2017 | Allen, Jr. et al. |
| 2017/0371608 A1 | 12/2017 | Wasserman |
| 2018/0108058 A1* | 4/2018 | Cotton ................. G06Q 30/01 |
| 2018/0173953 A1* | 6/2018 | Ghata ................. G06K 9/6202 |
| 2019/0102749 A1 | 4/2019 | Vijayan et al. |

* cited by examiner

SYSTEM AND METHOD FOR ACCESSING AND PROVIDING VEHICLE INFORMATION IN AUGMENTED REALITY

FIELD

This relates to augmented reality, and, more particularly, to providing an augmented-reality interface for accessing and providing vehicle-related information.

BACKGROUND

Persons interested in acquiring a new or used vehicle are faced with a daunting array of options. Dozens of vehicles of different types may meet a given individual's needs. Customers interested in buying a vehicle may find it difficult to locate information about a given vehicle using existing search tools for numerous reasons.

First, existing search tools typically rely on users knowing information about each vehicle, and, in particular, in order to locate relevant information about a given vehicle using those tools, a user must know at least some information about that vehicle such as, for example, make, model and/or trim level. If a user is mistaken about any of this information, then they may not be able to find the information they seek or worse, they may obtain information about a different vehicle or trim (effectively incorrect (or at least misleading) information when compared to what was actually sought).

Second, because of the aforementioned need to accurately identify a vehicle, existing search tools may result in wasted bandwidth and processing to handle repeated search queries as users repeatedly search using wrong information, retrieve and review irrelevant results, and/or navigate multiple search tools in hopes of finding accurate information despite an incorrect search query such as, for example, where the user recognizes that the information the tools are locating is (or at least seems) incorrect.

Third, because existing search tools rely on users entering information (e.g., make, model and trim) in order to be able to retrieve information about a vehicle, they can be difficult to use from a mobile device. For example, customers may find such tools difficult to utilize due to the need to enter information if they try to use them while visiting a car dealer/lot, especially if they are attempting to access information while navigating the lot and/or while they are also interacting and/or negotiating with a salesperson. In a particular example, a hurried user of such a search tool may unintentionally enter incorrect search query information.

BRIEF DESCRIPTION OF THE DRAWINGS

Embodiments are described in detail below, with reference to the following drawings.

Like reference numerals are used in the drawings to denote like elements and features.

DETAILED DESCRIPTION OF EXAMPLE EMBODIMENTS

Figure 1:
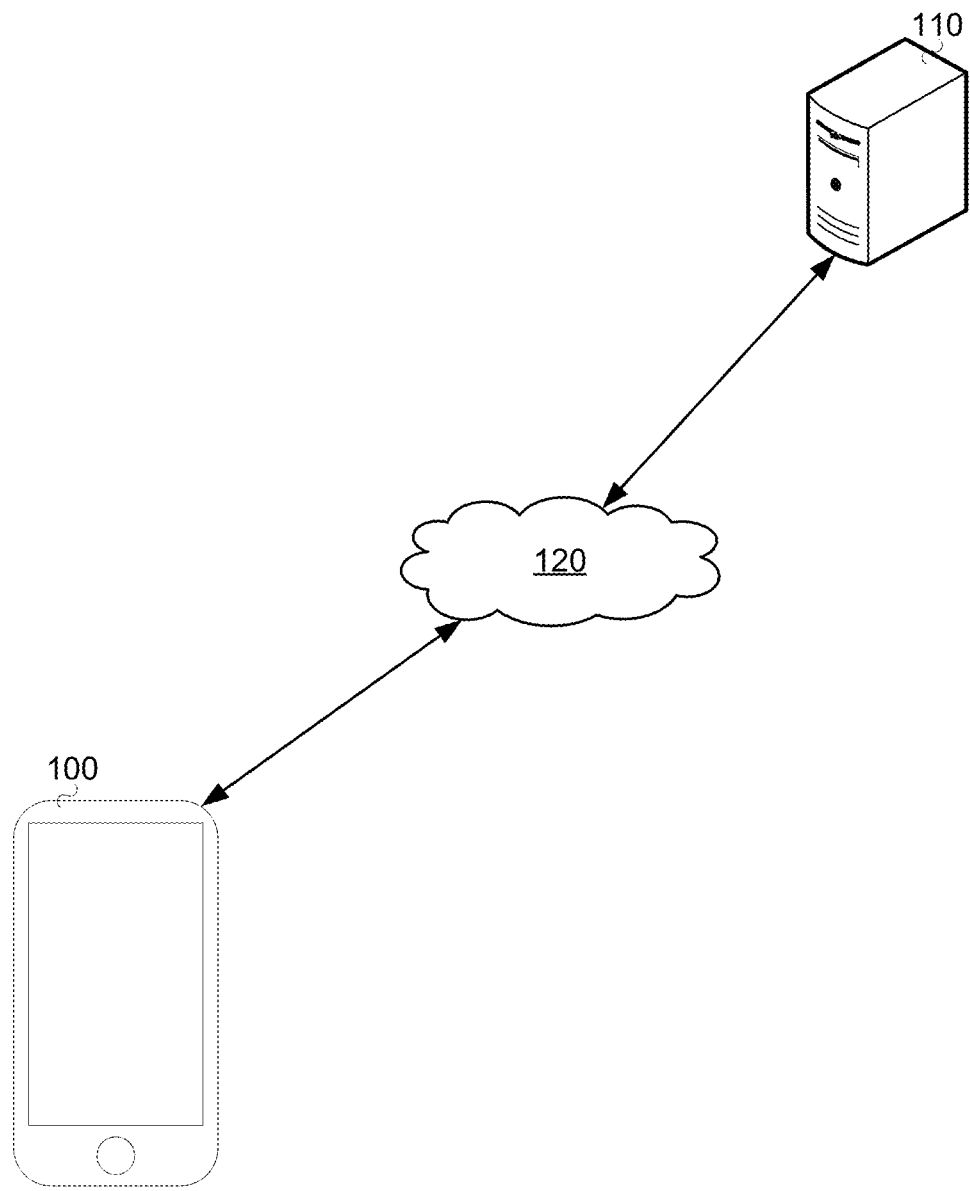
FIG. 1 is a schematic operation diagram illustrating an operating environment of an example embodiment.

According to the subject matter of the present application, there may be provided a computer system. The computer system may include a processor, an image capture module, a display module, and a memory module. The image capture module, the display module, and the memory module may be coupled to the processor. The memory module may store instructions that, when executed by the processor, cause the computer system to: capture, using the image capture module, an image of a portion of an environment including at least a portion of a motor vehicle; and display an augmented reality version of the environment using the display module. Displaying the augmented reality version of the environment may include: identifying, based on the captured image, at least a make and model of the motor vehicle; obtaining, from one or more data stores based on the make and model, at least one value characteristic of the vehicle; and compositing a second image of a portion of the environment captured using the image capture module with an indication of the at least one value characteristic of the vehicle.

Conveniently, in this way, information related to a vehicle may be presented in augmented reality. More particularly, information is accessed and displayed by a mobile computer system automatically, responsive to the vehicle being in view of an image capture module of the mobile computer system. This may allow information related to such a vehicle to be quickly reviewed by a user. Notably, because a user searching for vehicles may view a large number of vehicles in rapid succession (e.g., as they browse a new or used car lot), allowing such information to be accessed and reviewed based on a captured image may be more efficient than if, for example, the user had to access it manually. Further, the presentation of such information in augmented reality may allow a user to quickly identify the vehicle in relation to which such information is being presented and/or to assess the information without necessarily being aware of the particulars (e.g., make/model) of a given vehicle. This may, for example, reduce errors if the user is viewing multiple vehicles or is unsure of (or even mistaken as to) the particular make and model they are viewing as, because the system may automatically identify the vehicle in relation to which the information is presented, the need for the user to manually identify the vehicle may be eliminated or lessened.

In some implementations, identifying, based on the captured image, at least the make and model of the motor vehicle may include recognizing the motor vehicle based on one or more image recognition models for vehicles.

In some implementations, the at least one value characteristic of the vehicle may include at least one of a purchase cost, a finance cost, a lease cost, a fuel cost, and/or an insurance cost.

In some implementations, the at least one value characteristic of the vehicle may include an estimated total monthly cost of ownership determined based on a profile of a user associated with the computer system.

In some implementations, it may be that determining the total monthly cost of ownership includes: identifying, based on the profile of the user associated with the computer system, an interest rate available to the user to finance the motor vehicle; obtaining, from at least one of the data stores based on the make and model, a price for the vehicle; and determining, based on the price and the interest rate, a monthly cost to finance the motor vehicle.

Additionally or alternatively, it may be that determining the total monthly cost of ownership includes: obtaining, based on the profile of the user associated with the computer system, a travel profile for the user including a typical monthly mileage traveled by the user; obtaining, from at least one of the data stores based on the make and model, a fuel efficiency for the vehicle; obtaining an average fuel price for a home area associated with the travel profile; and determining, based on the travel profile, the fuel efficiency, and the average fuel price, an estimated monthly fuel cost for the vehicle.

Additionally or alternatively, it may be that determining the total monthly cost of ownership includes: obtaining, based on the profile of the user associated with the computer system, an estimated monthly cost to insure the motor vehicle for driving by the user.

Additionally or alternatively, it may be that displaying the augmented reality version of the environment further includes: obtaining, based on the profile of the user, a monthly transportation budget for the user; comparing the total monthly cost of ownership to the transportation budget; and, based on the comparing, compositing a second image of a portion of the environment captured using the image capture module with an indication identifying whether the total monthly cost of ownership is within the monthly transportation budget.

In some implementations, the instructions, when executed by the processor, may further cause the computer system to: store, in a viewing history store in association with the profile of the user, an indication of the make and model of the motor vehicle in association with the total monthly cost of ownership, the viewing history store storing indications of motor vehicles previously identified by the computer system in association with total monthly costs of ownership for those vehicles.

In some implementations, the instructions, when executed by the processor, may further cause the computer system to: retrieve, from the viewing history store, an indication of a previously-identified motor vehicle and a total monthly cost of ownership for that vehicle; retrieve a three-dimensional model of the previously-identified motor vehicle; capture, using the image capture module, an image of a portion of an environment, the captured image not including any portion of the previously-identified motor vehicle; and display an augmented reality version of the environment using the display module. The displaying may include rendering the three-dimensional model of the previously-identified motor vehicle and compositing the rendered model with the captured image of environment and the total monthly cost of ownership for that vehicle for that vehicle.

In some implementations, the instructions, when executed by the processor, may further cause the computer system to: identify, based on the previously-identified motor vehicles, one or more similar motor vehicles not previously identified, the one or more similar motor vehicles sharing one or more characteristics with at least some of the previously-identified motor vehicles; and provide an indication of the one or more similar motor vehicles.

According to the subject matter of the present application, there may be provided a computer-implemented method. The method may include capturing an image of a portion of an environment including at least a portion of a motor vehicle; and displaying an augmented reality version of the environment. Displaying the augmented reality version of the environment may include: identifying, based on the captured image, at least a make and model of the motor vehicle; obtaining, from one or more data stores based on the make and model, at least one value characteristic of the vehicle; and compositing a second image of a portion of the environment with an indication of the at least one value characteristic of the vehicle.

In some implementations, identifying, based on the captured image, at least the make and model of the motor vehicle may include recognizing the motor vehicle based on one or more image recognition models for vehicles.

In some implementations, the at least one value characteristic of the vehicle may include an estimated total monthly cost of ownership determined based on a profile of a user.

In some implementations, determining the total monthly cost of ownership may include: obtaining, based on the profile of the user, a travel profile for the user including a typical monthly mileage traveled by the user; obtaining, from at least one of the data stores based on the make and model, a fuel efficiency for the vehicle; obtaining an average fuel price for a home area associated with the travel profile; and determining, based on the travel profile, the fuel efficiency, and the average fuel price, an estimated monthly fuel cost for the vehicle.

Additionally or alternatively, determining the total monthly cost of ownership may include: obtaining, based on the profile of the user, an estimated monthly cost to insure the motor vehicle for driving by the user.

Additionally or alternatively, displaying the augmented reality version of the environment may further include: obtaining, based on the profile of the user, a monthly transportation budget for the user; comparing the total monthly cost of ownership to the transportation budget; and, based on the comparing, compositing a second image of a portion of the environment with an indication identifying whether the total monthly cost of ownership is within the monthly transportation budget.

In some implementations, the method may further include: storing, in a viewing history store in association with the profile of the user, an indication of the make and model of the motor vehicle in association with the total monthly cost of ownership, the viewing history store storing indications of previously-identified motor vehicles in association with total monthly costs of ownership for those vehicles.

In some implementations, the method may further include: retrieving, from the viewing history store, an indication of a previously-identified motor vehicle and a total monthly cost of ownership for that vehicle; retrieving a three-dimensional model of the previously-identified motor vehicle; capturing an image of a portion of an environment, the captured image not including any portion of the previously-identified motor vehicle; and displaying an augmented reality version of the environment. The displaying may include rendering the three-dimensional model of the previously-identified motor vehicle and compositing the rendered model with the captured image of environment and the total monthly cost of ownership for that vehicle for that vehicle.

In some implementations, the method further may further include: identifying, based on the previously-identified motor vehicles, one or more similar motor vehicles not previously identified, the one or more similar motor vehicles sharing one or more characteristics with at least some of the previously-identified motor vehicles; and providing an indication of the one or more similar motor vehicles.

According to the subject matter of the present application, there may be provided a computer-readable medium storing instructions that, when executed by a processor of a computer system, cause the computer system to perform the above-described method. In some implementations, the computer-readable medium may be a non-transitory computer-readable storage medium.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a mobile computer system 100 and a server computer system 110 communicate via a network 120.

The mobile computer system 100 is a mobile computing device. It may, as illustrated, be a smart phone. However, in some embodiments, the mobile computer system 100 may be a computing device of another type such as, for example, a personal computer, a laptop computer, a tablet computer, a notebook computer, a hand-held computer, a personal digital assistant, a portable navigation device, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 110 is a computer server. Such a computer system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The server computer system 110 may be in a location geographically disparate from the mobile computer system 100. Put differently, the mobile computer system 100 may be remote from the server computer system 110 and vice-versa.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

As further described below, the mobile computer system 100 may co-operate with the server computer system 110 via the network 120 in order to provide an augmented reality user interface for accessing and reviewing information related to vehicles. Augmented reality is a specialized form of virtual reality in which rendered objects in a virtual-reality environment are related to objects in a real-world scene or environment and are presented in real-time or near real-time through composition in real-time or near real-time with images of the real-world environment captured using an image capture module in real-time or near real-time.

Figure 2B:
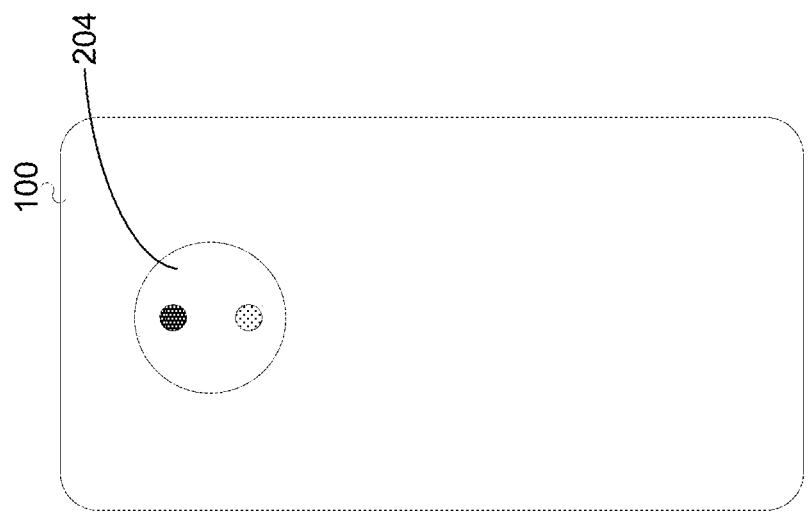
FIGS. 2A and 2B show the front and back of a mobile device, respectively.
Figure 2A:
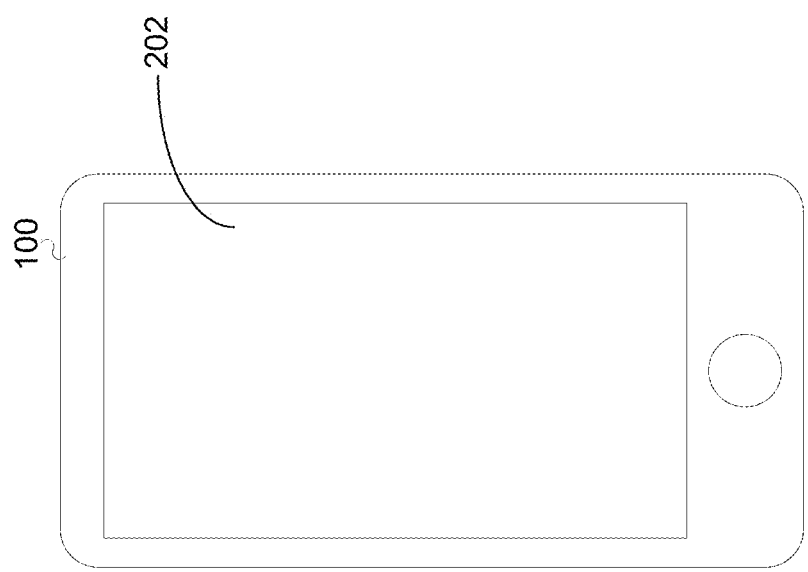

FIGS. 2A and 2B show the front and back of the mobile computer system 100, respectively.

Referring now to FIG. 2A, the front of the mobile computer system 100 includes a display 202. The display 202 is a module of the mobile computer system 100. The display 202 is for presenting graphics. The display 202 may be, for example, a liquid crystal display (LCD). In addition to being an output device, the display 202 may also be an input device. For example, the display 202 may allow touch input to be provided to the mobile computer system 100. In other words, the display 202 may be a touch sensitive display module. In a particular example, the display 202 may be a capacitive touch screen.

Referring to FIG. 2B, the rear of the mobile computer system 100 includes a camera 204. The camera 204 is an image capture module. The camera 204 is for capturing images of the environment of the mobile computer system 100. The camera 204 may incorporate a digital image sensor such as, for example, a charge coupled device (CCD) or a complementary metal-oxide-semiconductor (CMOS) image sensor.

Figure 3:
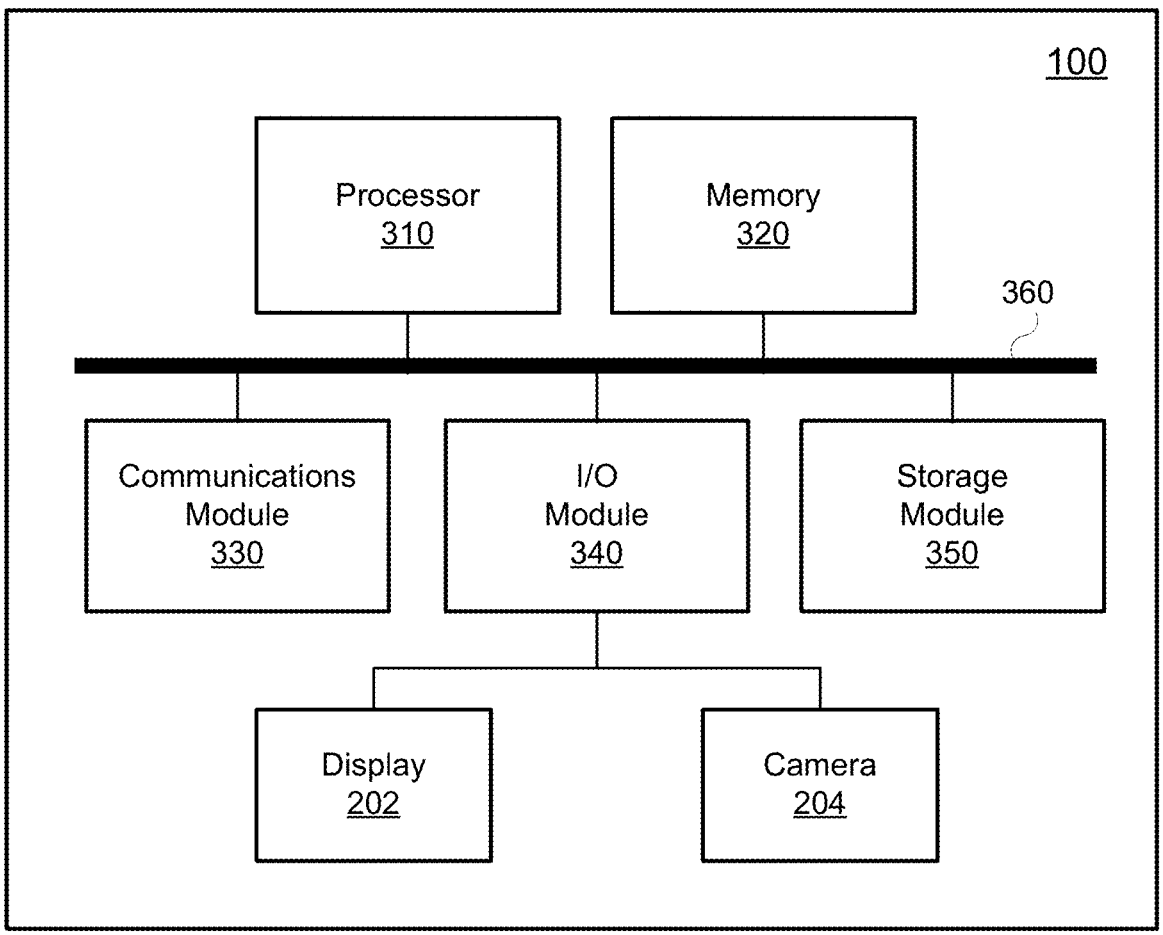
FIG. 3 is a high-level schematic diagram of the mobile device of FIGS. 2A and 2B.

FIG. 3 is a high-level schematic diagram of the mobile computer system 100.

The mobile computer system 100 includes a variety of modules. For example, as illustrated, the mobile computer system 100 may include a processor 310, a memory 320, a communications module 330, an I/O module 340, and/or a storage module 350. As illustrated, the foregoing example modules of the mobile computer system 100 are in communication over a bus 360.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the mobile computer system 100.

The communications module 330 allows the mobile computer system 100 to communicate with other computing devices and/or various communications networks such as, for example, the network 120. For example, the communications module 330 may allow the mobile computer system 100 to send or receive communications signals. Communications signals may be sent or received according to one or more protocols or according to one or more standards. The communications module 330 may allow the mobile computer system 100 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the mobile computer system 100 to communicate using near-field communication (NFC), via Wi-Fi™, using Bluetooth™ or via some combination of one or more networks or protocols. In some embodiments, all or a portion of the communications module 330 may be integrated into a component of the mobile computer system 100. For example, the communications module 330 may be integrated into a communications chipset.

The I/O module 340 is an input/output module. The I/O module 340 allows the mobile computer system 100 to receive input from and/or to provide input to components of the mobile computer system 100 such as, for example, various modules for input and output. For example, the I/O module 340 may, as shown, allow the mobile computer system 100 to receive input from and/or provide output to the display 202 and/or the camera 204.

The storage module 350 allows data to be stored and retrieved. In some embodiments, the storage module 350 may be formed as a part of the memory 320 and/or may be used to access all or a portion of the memory 320. Additionally or alternatively, the storage module 350 may be used to store and retrieve data from persisted storage other than the persisted storage (if any) accessible via the memory 320. In some embodiments, the storage module 350 may be used to store and retrieve data in/from a database. A database may be stored in persisted storage. Additionally or alternatively, the storage module 350 may access data stored remotely such as, for example, as may be accessed using a local area network (LAN), wide area network (WAN), personal area network (PAN), and/or a storage area network (SAN). In some embodiments, the storage module 350 may access data stored remotely using the communications module 330. In some embodiments, the storage module 350 may be omitted and its function may be performed by the memory 320 and/or by the processor 310 in concert with the communications module 330 such as, for example, if data is stored remotely.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
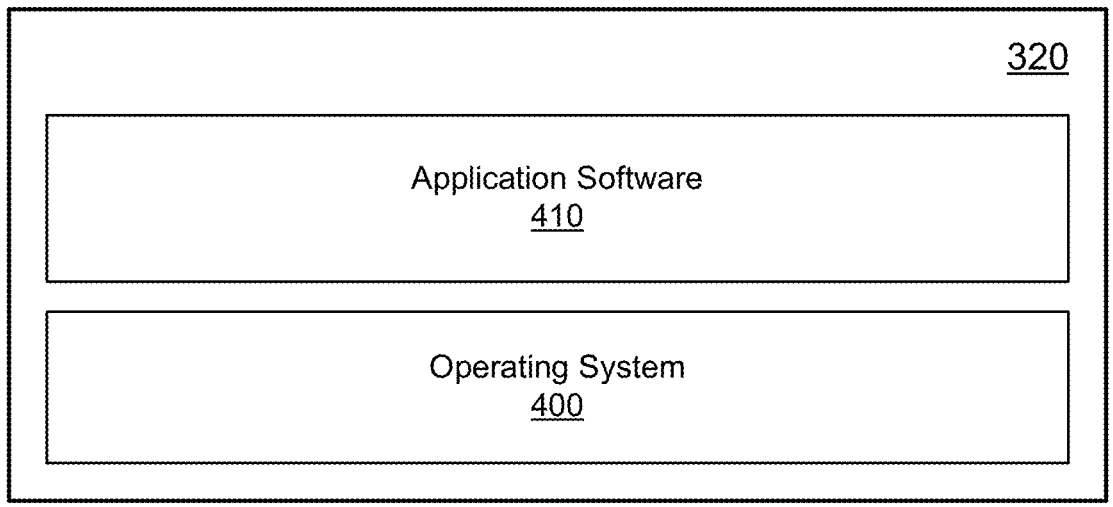
FIG. 4 shows a simplified organization of software components stored in a memory of the mobile device of FIGS. 2A and 2B.

FIG. 4 depicts a simplified organization of software components stored in the memory 320 of the mobile computer system 100. As illustrated, these software components include an operating system 400 and an application software 410.

The operating system 400 is software. The operating system 400 allows the application software 410 to access the processor 310 (FIG. 3), the memory 320, the communications module 330, the I/O module 340, and the storage module 350 of the mobile computer system 100. The operating system 400 may be, for example, Google™ Android™, Apple™ iOS™, UNIX™, Linux™, Microsoft™ Windows™, Apple OSX™ or the like.

The application software 410 adapts the mobile computer system 100, in combination with the operating system 400, to provide an augmented reality user interface for accessing and reviewing information related to vehicles.

Where the mobile computer system 100 is a smartphone or tablet, the application software 410 may be or may be a part of a smartphone or tablet application or "app". As further described below, in some embodiments, the information provided in relation to vehicles may include insurance costs. In some such embodiments, the application software 410 may be provided by an insurer and/or an insurance broker. Additionally or alternatively, in some embodiments, the information provided in relation to vehicles may include financing or leasing costs. In some such embodiments, the application software 410 may be provided by a lessor, a finance company, and/or a financial institution (e.g., a bank). Additionally or alternatively, in some embodiments, the information provided in relation to vehicles may include information related to the fuel economy of the vehicle and/or projected fuel costs for use of the vehicle. In some such embodiments, the application software 410 may be provided by an environmental agency or organization and/or a government agency. Notably, providing fuel efficiency and/or fuel cost information may influence potential purchasers to choose more fuel-efficient vehicles. Accordingly, in aggregate, software including a user interface presenting fuel efficiency information according to the subject matter of the present application may serve to reduce greenhouse gas emissions stemming from the use of vehicles that users of that software ultimately select. Put another way, it may be that the subject matter of the present application can help to resolve or mitigate environmental impacts (e.g., pollution and/or greenhouse gas emissions) and/or to conserve the natural environment and resources (e.g., fossil fuels) by encouraging the selection of more fuel-efficient vehicles.

Figure 5:
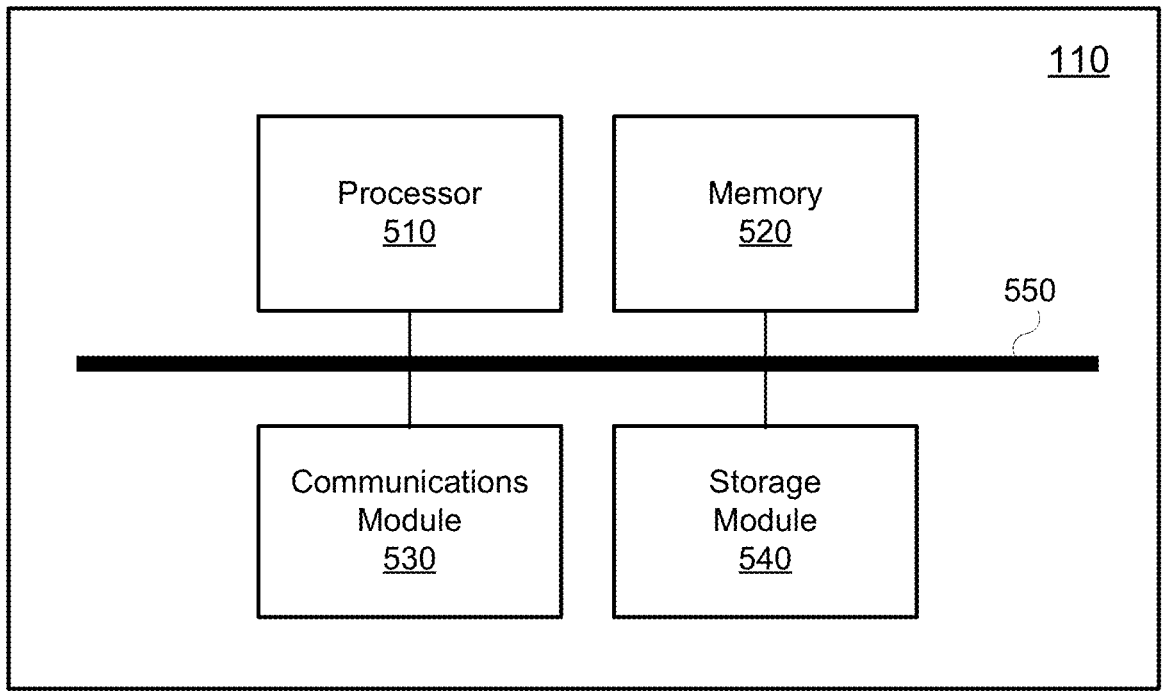
FIG. 5 is high-level schematic diagram of a server computing device.

FIG. 5 is a high-level schematic diagram of a server computer system 110.

The server computer system 110 includes a variety of modules. For example, as illustrated, the server computer system 110 may include a processor 510, a memory 520, a communications module 530, and/or a storage module 540. As illustrated, the foregoing example modules of the server computer system 110 are in communication over a bus 550.

The processor 510 is a hardware processor. The processor 510 may, for example, be one or more ARM, Intel x86, PowerPC processors or the like.

The memory 520 allows data to be stored and retrieved. The memory 520 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the server computer system 110.

The communications module 530 allows the server computer system 110 to communicate with other computing devices and/or various communications networks such as, for example, the network 120. The communications module 530 may allow the server computer system 110 to send or receive communications signals. Communications signals may be sent or received according to one or more protocols or according to one or more standards. For example, the communications module 530 may allow the server computer system 110 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 530 may allow the server computer system 110 to communicate via Wi-Fi™, using Bluetooth™ or via some combination of one or more networks or protocols. In some embodiments, all or a portion of the communications module 530 may be integrated into a component of the server computer system 110. For example, the communications module may be integrated into a communications chipset.

The storage module 540 allows the server computer system 110 to store and retrieve data. In some embodiments, the storage module 540 may be formed as a part of the memory 520 and/or may be used to access all or a portion of the memory 520. Additionally or alternatively, the storage module 540 may be used to store and retrieve data from persisted storage other than the persisted storage (if any) accessible via the memory 520. In some embodiments, the storage module 540 may be used to store and retrieve data in a database. A database may be stored in persisted storage. Additionally or alternatively, the storage module 540 may access data stored remotely such as, for example, as may be accessed using a local area network (LAN), wide area network (WAN), personal area network (PAN), and/or a storage area network (SAN). In some embodiments, the storage module 540 may access data stored remotely using the communications module 530. In some embodiments, the storage module 540 may be omitted and its function may be performed by the memory 520 and/or by the processor 510 in concert with the communications module 530 such as, for example, if data is stored remotely.

Software comprising instructions is executed by the processor 510 from a computer-readable medium. For example, software may be loaded into random-access memory from persistent storage of the memory 520. Additionally or alternatively, instructions may be executed by the processor 510 directly from read-only memory of the memory 520.

Figure 6:
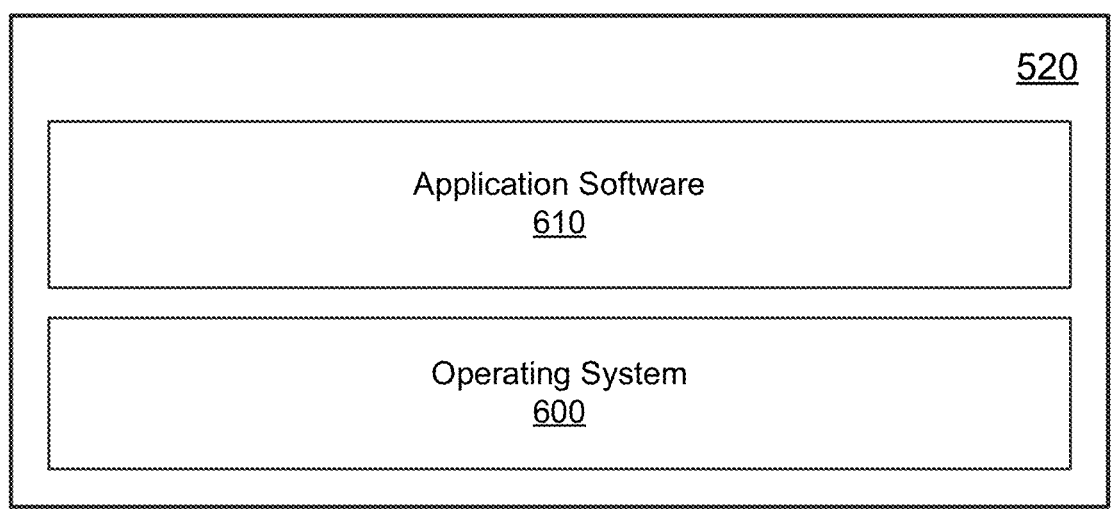
FIG. 6 shows a simplified organization of software components stored in a memory of the server computing device of FIG. 5.

FIG. 6 depicts a simplified organization of software components stored in the memory 520 of the server computer system 110. As illustrated, these software components include an operating system 600 and an application software 610.

The operating system 600 is software. The operating system 600 allows the application software 610 to access the processor 510, the memory 520, the communications module 530, and the storage module 540 of the server computer system 110. The operating system 600 may be, for example, UNIX™, Linux™, Microsoft™ Windows™, Apple OSX™ or the like.

The application software 610 may adapt the server computer system 110, in combination with the operating system 600, to co-operate with the mobile computer system 100 in providing an augmented reality user interface for accessing and reviewing information related to vehicles.

Figure 7:
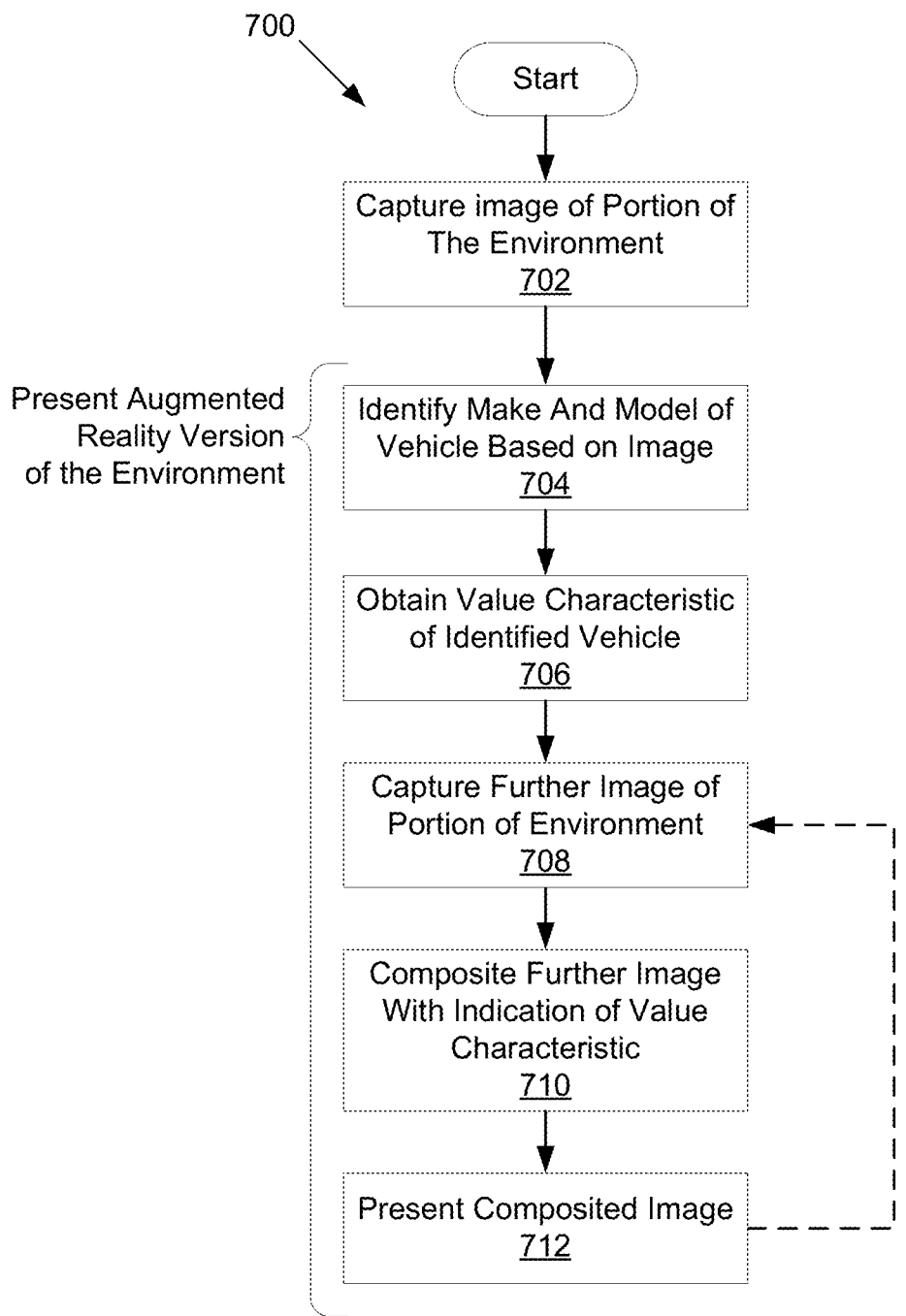
FIG. 7 is a flowchart showing operations performed by the mobile device of FIGS. 2A and 2B in presenting an augmented reality version of an environment including a vehicle.

The operation of the mobile computer system 100 will now be described with reference to the flowchart of FIG. 7 which illustrates a method 700 for providing an augmented reality user interface for accessing and reviewing information related to vehicles. In performing the method 700, operations starting from an operation 702 and continuing onward are performed by the processor 310 (FIG. 3) of the mobile computer system 100 executing instructions such as, for example, from the memory 320. In a particular example, some or all of the operations may be performed by the processor 310 of the mobile computer system 100 executing software such as, for example, a suitable instance of the application software 410 (FIG. 4).

The mobile computer system 100 is portable and thus can be brought to various environments. As further described below, where there is at least one vehicle in an environment in which the mobile computer system 100 is present, the method of 700 allows information related that/those vehicles to be accessed and reviewed using an augmented reality user interface.

At the operation 702, the mobile computer system 100 captures an image of a portion of its environment. The image is expected to include at least a portion of a motor vehicle that is in that environment. The image may be captured using an image capture module of the mobile computer system 100 such as, for example, the camera 204. In some implementations, the image may be captured responsive to user input such as may, for example, be received using an input device. For example, touch input selecting an option to capture an image and/or begin capturing images may be received from the display 202 via the I/O module 340 and the mobile computer system 100 may capture the image responsive thereto. Alternatively, it may be that the mobile computer system 100 captures the image automatically. For example, it may be that the mobile computer system 100 automatically captures images during some or all of the period that an app (e.g., the application software 410) is executing such as, for example, by way of a video capture mode.

By way of overview, based on the captured image of the portion of the environment including the motor vehicle (or at least a portion thereof), an augmented reality version of the environment may be provided by the mobile computer system 100 according to the remaining steps of the method 700 and using a display module (e.g., the display 202) of the mobile computer system 100. As further described below, that augmented reality version of the environment provides information related to the motor vehicle featured in the image captured at the operation 702. More particularly, as further described below, the mobile computer system 100 may automatically identify the vehicle based on the captured image and then obtain and provide information related to the vehicle. Conveniently, in this way, information related to the vehicle may be accessed and provided without requiring a user to manually identify the vehicle. Additionally, because it is presented in augmented reality, the information is provided in such a fashion as the user may review it without interrupting their viewing of the vehicle.

Following the capture of the image of the portion of the environment including the vehicle at the operation 702, an operation 704 is next.

At the operation 704, the vehicle depicted in the image captured at the operation 702 is identified based on that image. For example, it may be that at least the make and model of the vehicle are identified. Additionally or alternatively, other aspects of the vehicle may be identified such as, for example, one or more of the paint color, the trim level/options package, and/or the model year.

In some implementations, the vehicle may be identified based on its shape or other visual features thereof such as, for example, branding elements (e.g., decals, labels, etc.), the headlight configuration, etc. An image recognition model may be employed in recognizing the vehicle. For example, an image recognition model that is a model previously trained using machine learning techniques based on a training set including images of numerous vehicles may be employed.

In some implementations, the identification of the vehicle may be performed by the mobile computer system 100 acting alone. For example, the mobile computer system 100 may execute software corresponding to one or more image recognition models as discussed above and that/those models may serve to identify the vehicle depicted in the captured image. Additionally or alternatively, the mobile computer system 100 may co-operate with one or more remote computer systems such as, for example, the server computer system 110 in order to identify the vehicle depicted in the captured image. The mobile computer system 100 may co-operate with the server computer system 110 via the network 120 in order to identify the depicted vehicle. For example, the mobile computer system 100 may communicate an indication of the captured image (or a portion thereof) to the server computer system 110 via the network 120 (e.g., using the communications module 330) and the server computer system 110 may then receive this indication (e.g., using the communications module 530) and may then perform processing based on the indication in order to identify the vehicle. For example, it may be that the processor 510 of the server computer system 110 executes instructions corresponding to one or more image recognition modules such as were discussed above and that the vehicle is identified thereby. After it is identified by the server computer system 110, the server computer system 110 may send and the mobile computer system 100 may receive (e.g., via the network 120) information identifying the vehicle.

Following identification of the vehicle at the operation 704, an operation 706 is next.

At the operation 706, at least one value characteristic of the identified vehicle is obtained.

A value characteristic may include one or more values (e.g., numeric values) that are in some way characteristic of the vehicle. In some cases, one or more value characteristics may, more specifically, also be characteristic of the vehicle relative to an individual such as, for example, an individual associated with the mobile computer system 100. For example, that individual may be an individual having a profile associated with one or both of the mobile computer system 100 and the server computer system 110.

Value characteristics may be obtained in a variety of manners. For example, it may be that the mobile computer system 100 acquires (e.g., by making a request and/or further to identification of the vehicle at the operation 702) such information from a remote server. In a particular example, the mobile computer system 100 may receive one or more value characteristics from the server computer system 110 such as, for example, via the network 120 using the communications module 330. Additionally or alternatively, obtaining value characteristics may involve accessing one or more remote data stores. For example, one or more value characteristics of the vehicle may be obtained from one or more data stores such as, for example, based on the identifying information thereof as may have been obtained at the operation 704. For example, it may be that at least one value characteristic of the vehicle is obtained from data store(s) based on the make and model of the vehicle as previously identified. In some implementations, other information beyond value characteristics of the identified vehicle may also be obtained. For example, information may be obtained related to the availability of the vehicle for purchase as a new and/or used vehicle in a given geographic area (e.g., a home area of the aforementioned individual).

Various example value characteristics will now be discussed.

As a first example of value characteristics, one or more value characteristics may be obtained related to the cost to acquire the vehicle. For example, such value characteristics may include one or more of a purchase cost for the vehicle, a financing cost for the vehicle, and/or a lease cost for the vehicle. Notably, in some cases, more than one such cost could be obtained. For example, different costs could be obtained reflective of different configurations (e.g., option packages/trim levels) of the particular make and model of vehicle. In another example, costs may be provided for different financing/lease terms. Additionally or alternatively, costs to finance and/or lease may be expressed in terms of different time periods such as, for example, a monthly cost, a weekly cost, a bi-weekly cost, an overall cost over the term, etc. Furthermore, in the case of financing and/or leasing, possible value characteristics may include start-up (initial) costs and/or required/possible down-payment amounts etc. Notably, in some implementations, the price for the vehicle may be obtained based on a location of the mobile computer system 100 and may, for example, be a prevailing street price for the vehicle in the area proximate that location. For example, such a price may be obtained from one or more remote services such as may, for example, be associated with the TrueCar service provided by TrueCar, Inc. of Santa Monica, Calif. and/or some similar service.

As mentioned above, in some cases, value characteristics may include and/or be derivative of characteristics of a particular user. For example, it may be that financing and/or leasing costs are determined based on interest rates available to a user such as, for example, based on their creditworthiness and/or other data about the user such as, may for example, be available in a profile of that user as may be associated with one or both of the mobile computer system 100 and the server computer system 110 as mentioned above. In a particular example, financing and/or leasing costs may be determined by the mobile computer system 100 and/or a remote server (e.g., server computer system 110) by first identifying, based on the profile of the user, an interest rate that would be available to a user (e.g., the user associated with a user profile) to lease and/or finance the motor vehicle. For example, an automated loan underwriting system may be consulted by the mobile computer system 100 (e.g., via the network 120) to obtain an indication of an interest rate available to the user for the financing and/or leasing of the identified motor vehicle. In some cases, it may not be possible to obtain an auto loan for a particular vehicle (e.g., if it is too old); in such cases, the financing cost may be based on a product other than an auto loan such as, for example, a personal loan, if the user qualifies. Based on a price for the vehicle (e.g., obtained from one or more of the data stores based on information such as, for example, the make, model, and/or trim configuration of the vehicle) and an applicable interest rate (which may, as mentioned above, be identified based on one or more characteristics of the user), a periodic payment required to lease and/or finance the vehicle on some periodic (e.g., monthly, weekly, and/or bi-weekly) basis may be determined. In some cases, a particular vehicle may not be financeable for a particular user (e.g., due to their credit rating) and/or leasable for the particular user (e.g., because they drive too far each year); if so, one or more corresponding indications thereof could, additionally or alternatively, be obtained.

As a second example of value characteristics, one or more of the obtained value characteristics may relate to fuel cost for operation of the vehicle. For example, government agency (e.g., Environmental Protection Agency (EPA) or Transport Canada)-determined average fuel efficiency numbers may be obtained by the mobile computer system 100 based, on, for example, the make and model/configuration of the vehicle. Government fuel economy numbers may include, for example, typical consumption for a make and model of vehicle based for, for example, highway and/or city use or one or more combinations thereof. Additionally or alternatively, an average fuel economy for a user could be estimated such as, for example, based on information from an associated user profile such as the profile mentioned above. For example, a travel profile for the user may be obtained (e.g., from and/or based on the aforementioned user profile) such as may include a typical mileage traveled by the user during some period (e.g., a typical annual mileage or a typical monthly mileage) and this typical mileage may be used in determining an estimated fuel cost for that period (or some shorter or longer period through appropriate proration). Additionally or alternatively, such a travel profile may include other detail related to the user's driving habits (e.g., percentage city vs. percentage highway), driving style (e.g., slow/fast driver, smooth/aggressive driver, etc.), and/or other individual factors such as may affect fuel economy. Such values may be employed to determine a custom fuel economy value for the user. For example, the government fuel economy numbers could be adjusted to generate a custom fuel economy value for the user based on such factors. Furthermore, regardless of whether the fuel economy numbers are averages or adjusted/customized to the user, they may be used to provide an estimate of fuel consumption for the user (e.g., in gallons or litres) over one or more periods (e.g., weekly, monthly, and/or annually) such as, for example, based on their typical/estimated annual mileage and/or, more specifically, the fuel economy value(s) and the user's estimated annual city and highway mileage, etc. Additionally or alternatively, estimated annual fuel consumption may be expressed as an estimated cost over such a period such as, for example, based on current and/or projected fuel prices. In a particular example, an average fuel price could be determined for a home area for the user such as may be associated with the above-mentioned travel profile. For example, obtained value characteristics may include an estimated cost to fuel the vehicle for some period (e.g., an estimated monthly fuel cost or an estimated annual fuel cost). In summary, the obtained value characteristics may include an estimated fuel cost for the vehicle such as may, for example, be determined based on one of more of a travel profile, a fuel efficiency for the vehicle, and/or an average fuel price.

As a third example of value characteristics, obtained value characteristics may include costs related to insuring the vehicle. For example, an estimated cost to insure the vehicle for some period (e.g., a monthly insurance cost, an annual insurance cost, and/or a bi-annual insurance cost, etc.) could be obtained. Such an estimated insurance cost may be determined based on characteristics of the vehicle such as, for example, the make and/more model of the vehicle. Additionally or alternatively, characteristics of the user (or some other proposed driver) may be used in obtaining the estimate of insurance cost. For example, it could be that a quote for insurance is obtained based on one or more of an individual's driving record, estimated usage (e.g., annual mileage), intended use (e.g., business or personal), where the vehicle will be garaged, state/province where the vehicle will be registered, etc. The obtained value characteristics may include an estimated monthly cost to insure the motor vehicle for driving by the user such as may be obtained based on the profile of the user. Notably, some of all of the information used in obtaining an insurance cost/quote for the user may be drawn from or otherwise based on a profile of the user such as, for example, the profile discussed above. In some cases, a particular vehicle may not be insurable for a particular user or for the user's intended use; if so, an indication thereof could, alternatively, be obtained.

As a fourth example of value characteristics, one or more value characteristics—such as, for example, one or more of the example value characteristics discussed above—may be combined by the mobile computer system 100 and/or by some other computing device (e.g., the server computer system 110) to arrive at an estimated total cost of ownership over some period (e.g., weekly, monthly, annual, etc.). For example, where it is known that the user will be leasing or financing the vehicle, an (estimated) lease/finance cost, may be combined with an (estimated) insurance cost, and an (estimated) fuel cost to arrive at an (estimated) total cost of ownership. Such a total cost of ownership/estimated total cost of ownership may be expressed over some period as selected by the user and the inputs may be obtained for that same period and/or appropriately pro-rated in order to combine them to arrive at the estimated total cost of ownership for the period. The total cost of ownership may be customized for the user such as, for example, where one or more of the inputs to the combination are customized for the user. For example, it may be that one or more of the inputs to the combination are customized based on a profile of a user such as may be associated with one or both of the mobile computer system 100 and the server computer system 110 as discussed above. For example, a lease or finance cost used in determining a total cost of ownership may be obtained based on the interest rate available to user to lease/finance the vehicle and a price for the vehicle such as in manners discussed above. In summary, in some implementations, the estimated total cost of ownership may be determined, directly or indirectly, based on such a profile of a user.

Notably, in some implementations, the obtained value characteristics may be configurable. For example, it may be that a user may configure what information about vehicles (or a given vehicle) is to be provided responsive to vehicle identification and the list of value characteristics to be obtained may be correspondingly configured. In another example, a user may indicate whether they intend/desire to purchase outright, finance, and/or lease and costs may only be provided in relation to the preferred/selected one(s) of those acquisition options. In yet another example, a user may indicate a desired financing and/or leasing term and leasing/financing value characteristics may be obtained relative to that term.

Following the obtaining of the one or more value characteristics at the operation 706, an operation 708 is next.

At the operation 708, a further image of the environment may be captured by the mobile computer system 100 (e.g., a second image). In some implementations, a further image is always be captured at the operation 708. For example, a further image may be automatically captured if images are being captured as a part of a video mode. In other implementations, a further image may be conditionally captured such as, for example, if the mobile computer system 100 has moved relative to the environment, and/or if the image captured at the operation 702 is not processable to provide an augmented reality environment for one or more reasons (e.g., due to poor light levels). A further image may be captured in manners similar to how an image is captured at the operation 702.

Following the operation 708, an operation 710 is next.

At the operation 710, the further image of the environment captured at the operation 708 (or, if no further image was captured, the image captured at the operation 702) is composited by the mobile computer system 100 with one or more indications of at least one of the one or more value characteristics obtained at the operation 706. Put another way, the image captured at the operation 708 is modified so as to add visual elements corresponding to some or all of the value characteristics.

Following the operation 710, an operation 712 is next.

At the operation 712, the composited image generated at the operation 710 is displayed by the mobile computer system 100. For example, the mobile computer system 100 may present the image using the display 102.

Following the operation 712, flow control returns to the operation 708 to capture a further image of the environment, and so forth.

Notably, by performing operation 708, operation 710 and operation 712, and continually capturing, compositing, and displaying new images, the images presented by the display 102 of the mobile computer system 100 may be continually updated to reflect movement of the mobile computer system 100 within the environment and/or other visual changes in the environment. More particularly, by so doing in real-time or near-real time, the display 102 of the mobile computer system 100 may thus appear to provide a window onto the environment but with the modifications made by way of the operation 710 adding visual elements corresponding to value characteristic(s) thereby making the displayed image act as a window on an augmented reality version of the environment and, in particular, a version of the environment augmented by the addition of the visual elements related to the value characteristic(s).

The visual appearance, style, etc. of the added visual elements may vary between implementations. An example of how the mobile computer system 100 may present an augmented reality version of the environment including visual indications based on value characteristics of an identified vehicle is shown in FIG. 8.

Figure 8:
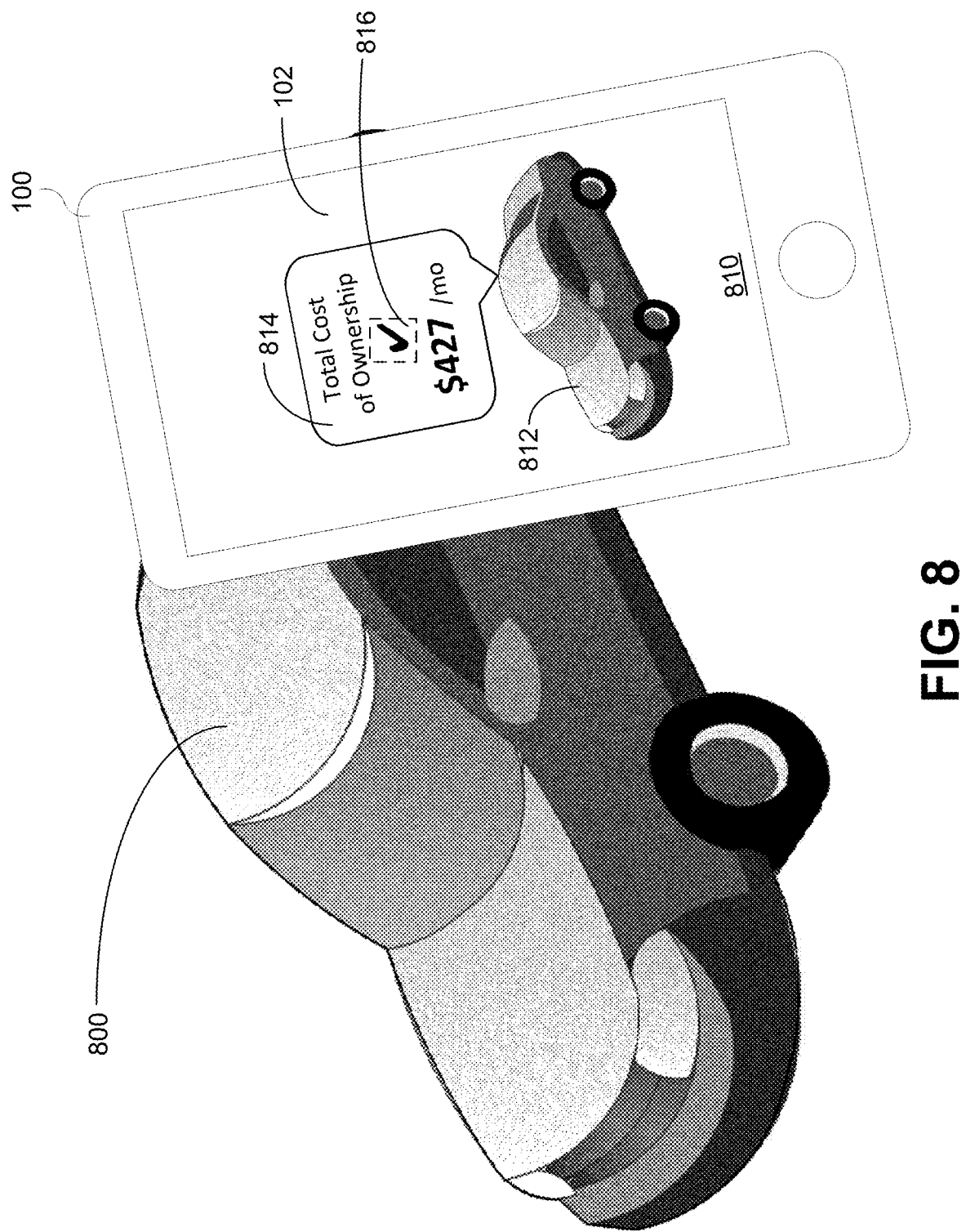
FIG. 8 illustrates how the mobile device of FIGS. 2A and 2B may present an augmented reality version of an example environment including an example vehicle.

As illustrated, the environment depicted in FIG. 8 includes a motor vehicle 800. The mobile computer system 100 may identify the motor vehicle 800 (e.g., its make and model) in manners discussed above (e.g., based on one or more image recognition models for vehicles) and may then present a visual display 810 via the display 102. The visual display 810 corresponds to an augmented reality version of the environment including the motor vehicle 800 and may be generated by the mobile computer system 100, for example, according to the method 700 discussed above.

The augmented reality version of the environment depicted in the visual display 810 includes a depiction 812 of the motor vehicle 800. Notably, the portion of the visual display 810 including the depiction 812 may correspond to an image of a portion of the environment that includes the motor vehicle 800 as captured by the mobile computer system 100. The visual display 810 also includes a visual element 814. The visual element 814 provides information related to the estimated total cost of ownership of the motor vehicle 800 and, in particular, indicates that the estimated monthly total cost of ownership for the motor vehicle 800 is $427 a month. Notably, therefore, the visual element 814 may be considered an indication of a value characteristic. The visual element 814 also includes a symbol 816 (a checkmark). The symbol 816 may indicate whether the total cost of ownership of the motor vehicle 800 is within a transportation budget of a user associated with the mobile computer system 100. More particularly, the symbol 816 as shown is a checkmark which may indicate that the monthly total cost of ownership of the motor vehicle 800 is within the user's monthly transportation budget (e.g., within a $500 monthly budget). By contrast, if the total cost of ownership was beyond the user's budget, an alternate symbol (e.g., an X) may be shown instead of a checkmark. Additionally or alternatively, in some implementations, color may be employed in place or in addition to such a symbol. For example, it could be that the symbol is rendered in one color (e.g., red) if the vehicle is not within the user's budget whereas the symbol is rendered in another color (e.g., green) if the vehicle is within the budget. Alternatively, the symbol may be omitted and some or all of the visual element 814 (e.g., the total monthly cost of ownership value) may be rendered in a color based on whether or not the vehicle is within the budget. Additionally or alternatively, a range of acquisition costs for the vehicle may be displayed such as, for example, by way of a number line such as, for example, where it is not be possible to clearly and/or definitely determine whether or not the cost of ownership is within a user's budget. For example, such a range could be displayed if the periodic costs associated with acquiring and/or owning a vehicle are variously outside, within, and/or generally close to the edge of the user's budget such as, for example, when assessed for different modes of acquiring the vehicle—e.g., due to differences in periodic costs if the vehicle is financed, leased, purchased outright, and/or if different financing and/or leasing terms are considered.

The symbol 816 (and/or the other potentially related visual devices discussed above) may be provided in a variety of manners. For example, the budget (e.g., a monthly transportation budget) may be obtained such as, for example, based on a profile of a user associated with the mobile computer system 100 and/or the server computer system 110 as discussed above. That transportation budget may then be compared to a value characteristic related to some total cost of ownership (e.g., a total monthly cost of ownership). Then an appropriate indication may be generated based on the comparison, with the indication identifying whether the cost of ownership is within the budget. Finally, that indication may be composited with a captured image of the environment (e.g., at the operation 710 or in manners similar to those discussed in relation thereto) and then the resultant image may be displayed (e.g., at the operation 712 or in manners similar to those discussed in relation thereto.)

Implementations of the subject matter of the present application may be used by users as they shop for vehicles. For example, users may use them to easily access and review information related to vehicles as they encounter them on various car lots, in a parking lot, on the street, etc. In some implementations, a history of such viewed vehicles may be maintained. For example, a viewing history store to hold such a history may be maintained (e.g., in storage of one or both of the mobile computer system 100 and the server computer system 110), for example in association with a profile of the user such as, for example, the profile of a user associated with the mobile computer system 100 and/or the server computer system 110 as discussed below. In such a viewing history store, indications of information related to viewed vehicles (e.g., make and model) may be maintained. For example, the viewing history store may store indications of motor vehicles previously identified by the mobile computer system 100. Additionally or alternatively, the viewing history store may store some or all of the value characteristics associated with those previously-viewed vehicles. For example, the viewing history may store indications of the total monthly cost of ownership of those previously-viewed vehicles. Whatever the value characteristics that are stored in the viewing history store, where indications of motor vehicles previously identified by the mobile computer system 100 are also stored in the viewing history store, such value characteristics may be stored in association with corresponding ones of the indications of the motor vehicles previously identified.

Such a viewing history store may be employed in a variety of manners and/or to a variety of ends.

As a first example of how such a viewing history store may be employed, a viewing history store may be used in providing recommendations of other vehicles to be considered by the user. For example, a history of previously-identified motor vehicles from the viewing history store may be used by the mobile computer system 100 to provide recommendations of other vehicles to considered by identifying, based on the previously-identified motor vehicles, one or more similar motor vehicles that are not included in the history (i.e., that were not previously identified). The one or more similar motor vehicles may, for example, be similar to the previously-identified vehicles in that they share one or more characteristics (e.g., vehicle type, color, cost, etc.) with at least some of the previously-identified motor vehicles. In some implementations, the user may optionally provide input selecting ones of the previously-viewed vehicles that they are interested in and the recommendations may be generated based on only the selected vehicles. Recommendations may be generated by the mobile computer system 100 and/or some other remote computing device such as, for example, the server computer system 110. For example, the mobile computer system 100 and the server computer system 110 may co-operate (e.g., via the network 120) to generate and provide recommendations. Recommendations may be presented by the mobile computer system 100. For example, an indication of the one or more similar motor vehicles may be provided by the mobile computer system 100 such as, for example, by way of a visual display presented using the display 102.

As a second example of how a viewing history may be employed, in some implementations, in addition to or as an alternative to providing recommendations of similar motor vehicles, recommendations of other products and/or services related to previously-viewed motor vehicles may be provided. For example, the user could be provided with recommendations of suitable vehicle accessories for a class of motor vehicles identified based on the history.

As a third example of how a viewing history may be employed, based on the type of nature of the previously-viewed motor vehicles, life changes may be detected. For example, where the user is viewing mini-vans or family sedans (suggesting interest in a purchase of a "family vehicle"), they may be detected to be expecting a new child. As another example, where the user is viewing pick-up trucks with towing capability, they may be detected to be planning a major purchase requiring towing such as, for example, buying a boat. Additionally, in some implementations, based on such detected life events, recommendations of other vehicles and/or products may be provided.

As a fourth example of how a viewing history may be employed, it may be that functionality is provided allowing the user to review the history of previously-viewed motor vehicles. For example, the mobile computer system 100 may allow the user to review previously-viewed motor vehicles from the history in virtual reality or in augmented reality.

Figure 9:
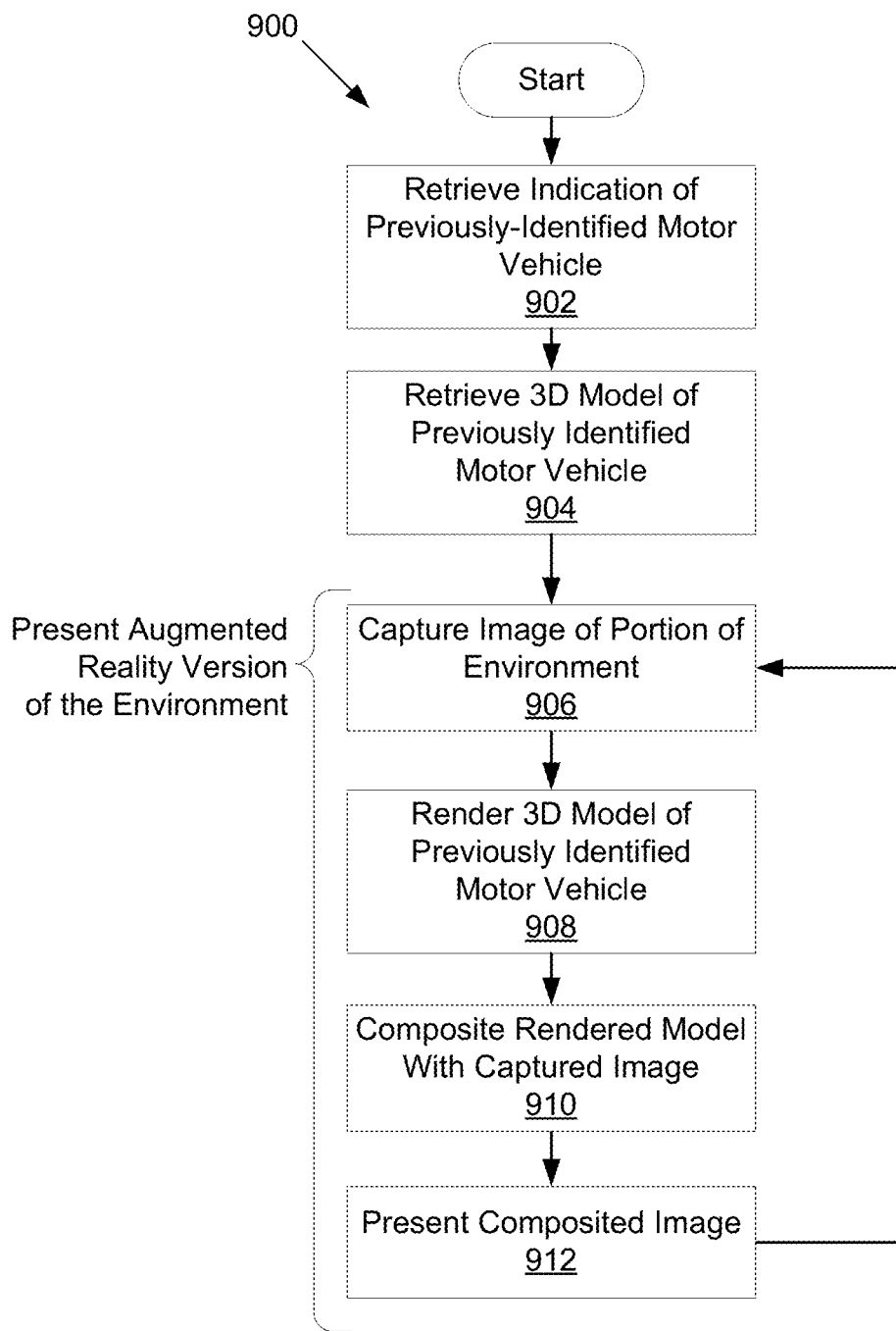
FIG. 9 is a flowchart showing operations performed by the mobile device of FIGS. 2A and 2B in presenting an augmented reality version of an environment including a representation of a previously-encountered vehicle.

The flowchart of FIG. 9 illustrates a method 900 for providing an augmented reality presentation allowing review of a previously-identified motor vehicle and related information. In performing the method 900, operations starting from an operation 902 and continuing onward are performed by the processor 310 (FIG. 3) of the mobile computer system 100 executing instructions such as, for example, from the memory 320. In a particular example, some or all of the operations may be performed by the processor 310 of the mobile computer system 100 executing software such as, for example, a suitable instance of the application software 410 (FIG. 4).

At the operation 902, an indication of a previously identified motor vehicle is retrieved. The indication may, for example, be retrieved from the viewing history store. In some implementations, the indication may be retrieved responsive to some trigger, such as, for example user input (e.g., selecting to review previously-encountered vehicles). Such user input may be received via an input module (e.g., via the I/O module 340) such as, for example, using the display 202 where it is a touchscreen.

In some implementations, other information from the viewing history store may also be retrieved. For example, where the viewing history store includes indications of value characteristics for previously-viewed motor vehicles, one or more of such previously-stored value characteristics may be retrieved. For example, a total monthly cost of ownership for the previously-identified motor vehicle may be retrieved from the viewing history store.

Following retrieval of data from the viewing history store at the operation 902, an operation 904 is next.

At the operation 904, a three-dimensional model of the previously-identified motor vehicle is obtained. For example, such a model may be retrieved from storage such as, for example, using the storage module 350. Additionally or alternatively, such a model may be retrieved from a remote server such as, for example, the server computer system 110. In a particular example, the model may be retrieved by the mobile computer system 100 from the server computer system 110 via the network 120 such as, for example, using the communications module 330.

Following retrieval of the model at the operation 904, an operation 906 is next.

At the operation 906, an image of the portion of the environment including the mobile computer system 100 is captured. Such an image may be obtained in manners similar to the capturing of an image at the operation 702 of the method 700. In a particular example, an image of a portion of the environment may be captured by the mobile computer system 100 using an image capture module such as, for example, the camera 204. The environment may be expected not to include the previously-viewed vehicle. Accordingly, the captured image may not include the previously-viewed vehicle (or any portions thereof).

Following the capture of the image at the operation 906, an operation 908 is next.

At the operation 908, the three-dimensional model of the previously-identified motor vehicle is rendered yielding an image of the rendered 3D model. In some implementations, the model may be rendered based on a current position of the mobile computer system 100 in the environment and/or relative to one or more physical items such as may be detected in the image captured at the operation 906. For example, it may be that the model is rendered with a direction and size corresponding to a flat surface in the environment that is depicted in and detected by the mobile computer system 100 in the captured image. Additionally or alternatively, the model may be rendered at a pre-defined size and/or in a defined direction.

Following the rendering of the 3D model at the operation 908, an operation 910 is next.

At the operation 910, the rendered image of the model is composited with the image captured at the operation 906. The rendered model may be composited with the captured image of the environment in manners akin to the compositing discussed above in relation to the operation 710. In some implementations, the rendered model may be positioned at a defined position within the frame of the captured image. Additionally or alternatively, the rendered model may be depicted in a defined position in the environment as identified by the mobile computer system 100 (e.g., based on the captured image). In a particular example, the rendered model may be positioned so as to appear in the resultant composited image as lying along a flat surface in the environment (e.g., a table top) that is depicted in the captured image as discussed above. Notably, where the model is rendered with a direction and size corresponding to the flat surface as discussed above in relation to the operation 908, if the rendered model is then positioned in the composited image along that flat surface, then it may appear as though the motor vehicle is resting on that flat surface (e.g., on a table top).

Additionally or alternatively, where a value characteristic is retrieved from the viewing history store at the operation 902 as discussed above, a visual indication thereof may, additionally or alternatively, be composited with the image captured at the operation 906. In this way, a display akin to the display previously provided when the motor vehicle was present in the environment may be provided when the user is viewing that same vehicle (as rendered based on the 3D model) while reviewing the viewing history.

Following the operation 912, control flow may return to the operation 906 to capture a further image of a portion of the environment, with that image reflecting any changes in the environment and/or any repositioning of the mobile computer system 100 relative thereto. As discussed above in relation to the method 700, by performing this and the other operations involved in presenting an augmented reality version of the environment repeatedly in real-time or near real-time, it may be made to seem as though the mobile computer system 100 is displaying a window into an augmented reality version of the environment.

In some implementations, a presentation of vehicles found in the viewing history may include a presentation of more than one previously-viewed vehicle. Such a presentation may be provided in manners similar to the method 900 but with the retrieval of information and 3D models related to more than one previously-viewed vehicle and the rendering of more than one such 3D model as well as appropriate compositing of those rendered models with captured images.

Figure 10:
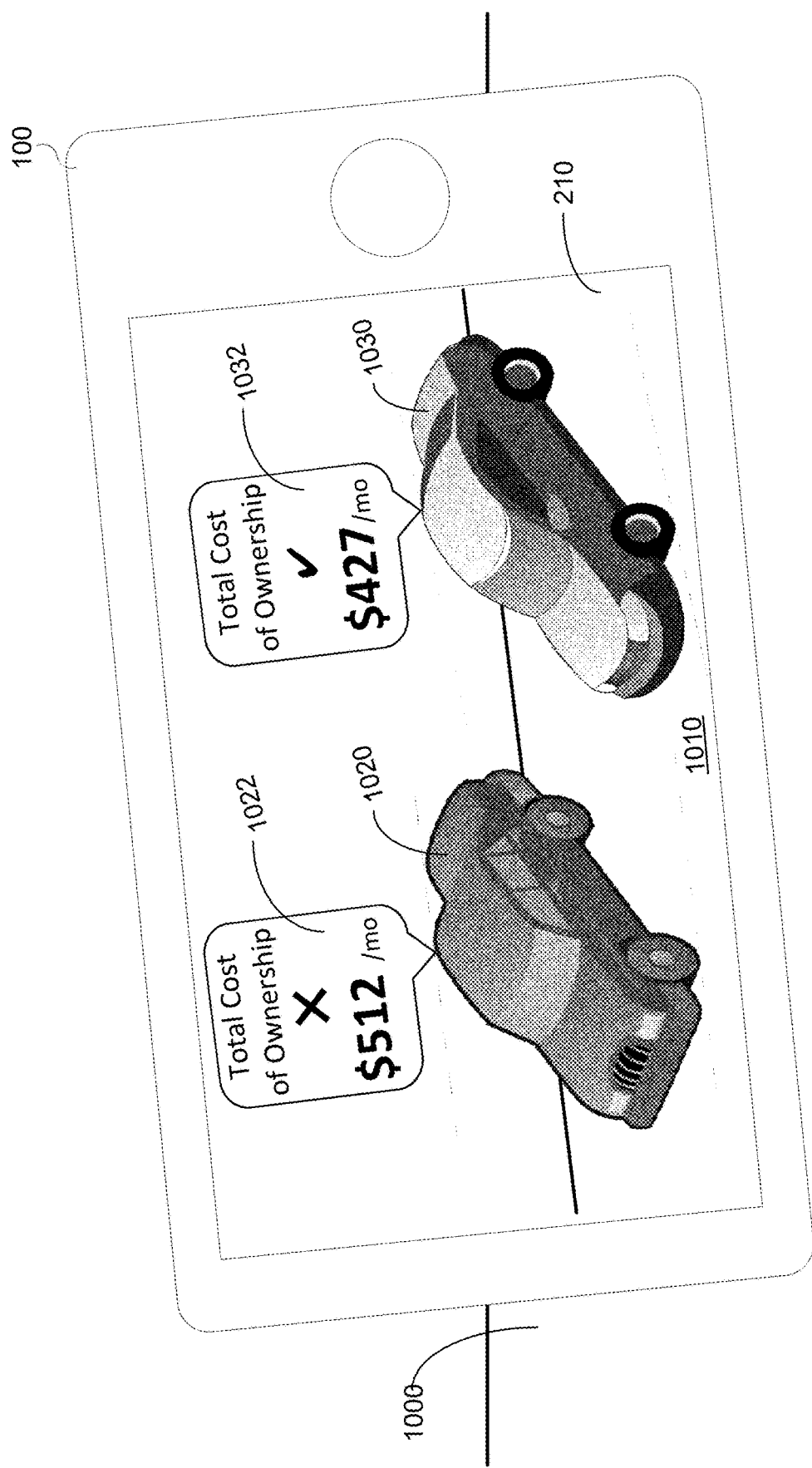
FIG. 10 illustrates how the mobile device of FIGS. 2A and 2B may present an augmented reality version of an example environment that includes representations of previously-encountered vehicles.

As example of such a presentation of an augmented reality version of an example environment that includes representations of more than one previously-encountered vehicle is provided in FIG. 10.

As illustrated, the environment includes a flat surface 1000. The mobile computer system 100 is displaying, using the display 210, a visual presentation 1010 of a portion of the environment that includes the flat surface 1000. In particular, in the visual presentation 1010, a rendered model of a first vehicle 1020 and a rendered model of a second vehicle 1030 have been composited with a captured image of the environment so as to appear to rest along the flat surface 1000. Information related to value characteristics of the first vehicle 1020 and the second vehicle 1030 are also provided in the visual presentation 1010 by way of corresponding visual elements, namely a first visual element 1022 and a second visual element 1032, respectively. As illustrated, the first visual element 1022 and the second visual element 1032 include information related to a total monthly cost of ownership of each of the first vehicle 1020 and the second vehicle 1030, respectively. Further, similar to as was discussed above in relation to FIG. 8, the first visual element 1022 includes a symbol (an X) indicating that the first vehicle 1020 has a total cost of ownership falling outside the user's budget while the second visual element 1032 includes a symbol (a checkmark) indicating the total cost of ownership of the second vehicle 1030 is within that same budget.

The above provides example of how vehicle information may be accessed and provided in augmented reality. The above examples are capable of variation without deviating from the subject matter of the present application. For example, other sorts of augmented reality devices may be employed other than a bare mobile device like mobile computer system 100. An example alternative augmented reality device will now be described with reference to FIGS. 11A and 11B.

Figure 11A:
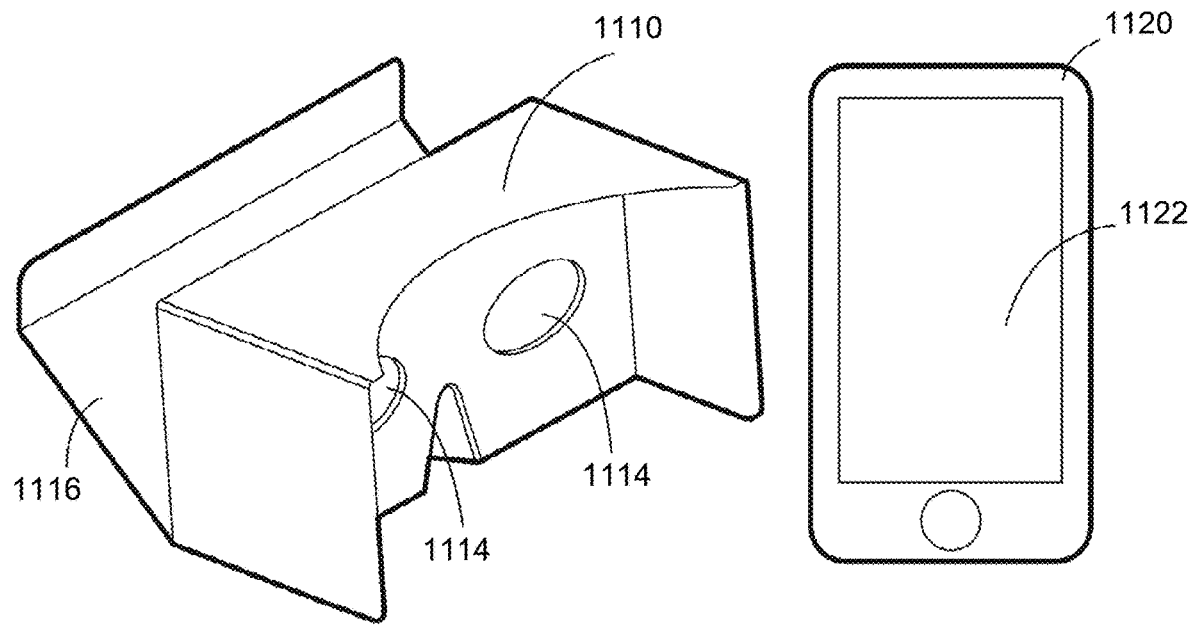
FIGS. 11A and 11B show an augmented reality device in partially assembled and assembled states, respectively.
Figure 11B:
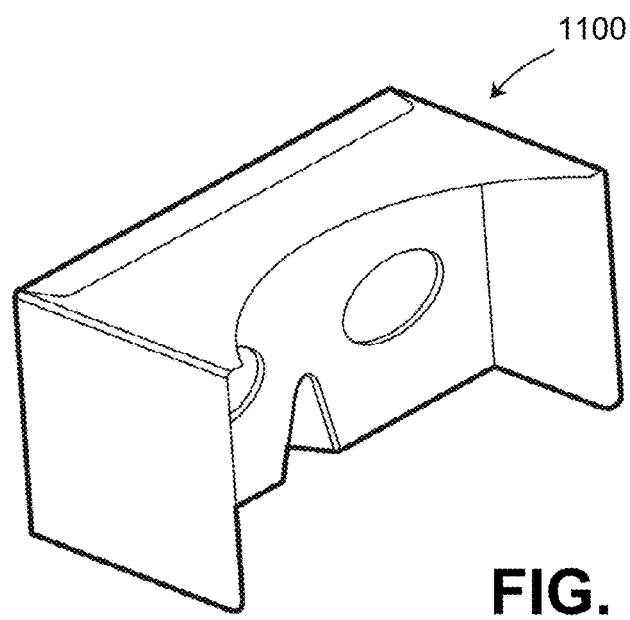

As best shown in FIG. 11A, an augmented reality device 1100 may be formed using a kit consisting of a frame 1110 and a smartphone 1120. The smartphone 1120 may be the same or similar to the mobile computer system 100. The smartphone 1120 may be inserted into a compartment or cavity with a screen 1122 of the smartphone 1120 facing towards a pair of viewports 1114. A rear door 1116 of the frame 1110 may then be closed as shown in FIG. 11B. As such, the augmented reality device 1100, when assembled, includes a virtual-reality headset frame (the frame 1110) and the smartphone 1120 which is mounted in the frame 1110. Notably, the augmented reality device 1100 may be worn or donned such as, for example, by holding it up to or mounting it against the face of a user. As such, the augmented reality device 1100 may be considered a wearable augmented reality device.

The frame 1110 may be made of a variety of materials such as, for example, cardboard or a suitable plastic such as, for example, ethylene-vinyl acetate (EVA). Further, it may be that plastic or glass lenses are provided at the viewports 1114. In a particular example, the frame 1110 may be a Google™ Cardboard frame or similar.

The wearable augmented reality device 1100 includes a pair of viewports 1114 through which a view may look to view images displayed by the screen 1122. Further, the smartphone 1120 may include one or more cameras akin to the camera 140 as may be employed to capture images of portions of an environment that will be presented in augmented reality. Additionally, smartphone 1120 is a computing device and may, therefore, serve a similar purpose and potentially provide similar functionality to the mobile computer system 100 in terms of performing operations such as, for example, operations corresponding to one or both of the method 700 (FIG. 7) and the method 900 (FIG. 9).

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
   a processor;
   an image capture module coupled to the processor;
   a display module coupled to the processor; and
   a memory module coupled to the processor and storing instructions that, when executed by the processor, cause the computer system to:
      capture, using the image capture module, an image of a portion of an environment including at least a portion of a motor vehicle; and
      display an augmented reality version of the environment using the display module, wherein displaying the augmented reality version of the environment includes:
         identifying, based on the captured image, at least a make and model of the motor vehicle;
         obtaining, from one or more data stores based on the make and model, at least one value characteristic of the vehicle, the at least one value characteristic of the vehicle including an estimated total monthly cost of ownership determined based on a profile of a user associated with the computer system;
         compositing a second image of a portion of the environment captured using the image capture module with an indication of the at least one value characteristic of the vehicle and an indication including a symbol indicating whether the total cost of monthly ownership is within a monthly transportation budget of the user;
         store, in a viewing history store in association with the profile of the user, an indication of the make and model of the motor vehicle in association with the total monthly cost of ownership, the viewing history store storing indications of motor vehicles previously identified by the computer system in association with total monthly costs of ownership for those vehicles;
         retrieve, from the viewing history store, an indication of two or more previously-identified motor vehicles and a total monthly cost of ownership for that vehicle;
         retrieve a three-dimensional model of the two or more previously-identified motor vehicles; and
         display an augmented reality version of the portion of the environment captured using the image capture model including rendering the three-dimensional models of the previously-identified motor vehicles and compositing the rendered models with the captured image of the environment, an indication of the at least one value characteristic of the vehicles and the indication including the symbol indicating whether the total cost of monthly ownership is within the monthly transportation budget of the user for the vehicles.

2. The computer system of claim 1, wherein the identifying, based on the captured image, at least the make and model of the motor vehicle includes recognizing the motor vehicle based on one or more image recognition models for vehicles.

3. The computer system of claim 1, wherein the at least one value characteristic of the vehicle includes at least one of a purchase cost, a finance cost, a lease cost, a fuel cost, and an insurance cost.

4. The computer system of claim 1, wherein determining the total monthly cost of ownership includes:
   identifying, based on the profile of the user associated with the computer system, an interest rate available to the user to finance the motor vehicle;
   obtaining, from at least one of the data stores based on the make and model, a price for the vehicle; and
   determining, based on the price and the interest rate, a monthly cost to finance the motor vehicle.

5. The computer system of claim 1, wherein determining the total monthly cost of ownership includes:
   obtaining, based on the profile of the user associated with the computer system, a travel profile for the user including a typical monthly mileage traveled by the user;
   obtaining, from at least one of the data stores based on the make and model, a fuel efficiency for the vehicle;
   obtaining an average fuel price for a home area associated with the travel profile; and
   determining, based on the travel profile, the fuel efficiency, and the average fuel price, an estimated monthly fuel cost for the vehicle.

6. The computer system of claim 1, wherein determining the total monthly cost of ownership includes:
   obtaining, based on the profile of the user associated with the computer system, an estimated monthly cost to insure the motor vehicle for driving by the user.

7. The computer system of claim 1, wherein displaying the augmented reality version of the environment further includes:
   obtaining, based on the profile of the user, the monthly transportation budget for the user; and
   comparing the total monthly cost of ownership to the transportation budget.

8. The computer system of claim 1, wherein the instructions, when executed by the processor, further cause the computer system to:
   retrieve, from the viewing history store, an indication of a previously-identified motor vehicle and a total monthly cost of ownership for that vehicle;
   retrieve a three-dimensional model of the previously-identified motor vehicle;
   capture, using the image capture module, an image of a portion of an environment, the captured image not including any portion of the previously-identified motor vehicle; and
   display an augmented reality version of the environment using the display module, the displaying including rendering the three-dimensional model of the previously-identified motor vehicle and compositing the rendered model with the captured image of environment and the total monthly cost of ownership for that vehicle.

9. The computer system of claim 1, wherein the instructions, when executed by the processor, further cause the computer system to:
- identify, based on the previously-identified motor vehicles, one or more similar motor vehicles not previously identified, the one or more similar motor vehicles sharing one or more characteristics with at least some of the previously-identified motor vehicles; and
- provide an indication of the one or more similar motor vehicles.

10. The computer system of claim 1, wherein the symbol indicating whether the total cost of monthly ownership is within a monthly transportation budget of the user includes one of a symbol indicating that the total cost of monthly ownership is within the monthly transportation budget of the user and a different symbol indicating that the total cost of monthly ownership is not within the monthly transportation budget of the user.

11. The computer system of claim 10, wherein the symbol indicating that the total cost of monthly ownership is within the monthly transportation budget of the user includes a checkmark and the different symbol indicating that the total cost of monthly ownership is not within the monthly transportation budget of the user includes an X.

12. A computer-implemented method comprising:
- capturing an image of a portion of an environment including at least a portion of a motor vehicle; and
- displaying an augmented reality version of the environment, wherein displaying the augmented reality version of the environment includes:
  - identifying, based on the captured image, at least a make and model of the motor vehicle;
  - obtaining, from one or more data stores based on the make and model, at least one value characteristic of the vehicle, the at least one value characteristic of the vehicle including an estimated total monthly cost of ownership determined based on a profile of a user associated with the computer system; and
  - compositing a second image of a portion of the environment with an indication of the at least one value characteristic of the vehicle and an indication including a symbol indicating whether the total cost of monthly ownership is within a monthly transportation budget of the user;
  - storing, in a viewing history store in association with the profile of the user, an indication of the make and model of the motor vehicle in association with the total monthly cost of ownership, the viewing history store storing indications of previously-identified motor vehicles in association with total monthly costs of ownership for those vehicles
  - retrieving, from the viewing history store, an indication of two or more previously-identified motor vehicles and a total monthly cost of ownership for that vehicle;
  - retrieving a three-dimensional model of the two or more previously-identified motor vehicles; and
  - displaying an augmented reality version of the portion of the environment captured using the image capture model including rendering the three-dimensional models of the previously-identified motor vehicles and compositing the rendered models with the captured image of the environment, an indication of the at least one value characteristic of the vehicles and the indication including the symbol indicating whether the total cost of monthly ownership is within the monthly transportation budget of the user for the vehicles.

13. The computer-implemented method of claim 12, wherein the identifying, based on the captured image, at least the make and model of the motor vehicle includes recognizing the motor vehicle based on one or more image recognition models for vehicles.

14. The computer-implemented method of claim 12, wherein determining the total monthly cost of ownership includes:
- obtaining, based on the profile of the user, a travel profile for the user including a typical monthly mileage traveled by the user;
- obtaining, from at least one of the data stores based on the make and model, a fuel efficiency for the vehicle;
- obtaining an average fuel price for a home area associated with the travel profile; and
- determining, based on the travel profile, the fuel efficiency, and the average fuel price, an estimated monthly fuel cost for the vehicle.

15. The computer-implemented method of claim 12, wherein determining the total monthly cost of ownership includes:
- obtaining, based on the profile of the user, an estimated monthly cost to insure the motor vehicle for driving by the user.

16. The computer-implemented method of claim 12, wherein displaying the augmented reality version of the environment further includes:
- obtaining, based on the profile of the user, the monthly transportation budget for the user; and
- comparing the total monthly cost of ownership to the transportation budget.

17. The computer-implemented method of claim 12, further comprising:
- retrieving, from the viewing history store, an indication of a previously-identified motor vehicle and a total monthly cost of ownership for that vehicle;
- retrieving a three-dimensional model of the previously-identified motor vehicle;
- capturing an image of a portion of an environment, the captured image not including any portion of the previously-identified motor vehicle; and
- displaying an augmented reality version of the environment, the displaying including rendering the three-dimensional model of the previously-identified motor vehicle and compositing the rendered model with the captured image of environment and the total monthly cost of ownership for that vehicle.

18. The computer-implemented method of claim 12, further comprising:
- identifying, based on the previously-identified motor vehicles, one or more similar motor vehicles not previously identified, the one or more similar motor vehicles sharing one or more characteristics with at least some of the previously-identified motor vehicles; and
- providing an indication of the one or more similar motor vehicles.

19. The computer-implemented method of claim 12, wherein the symbol indicating whether the total cost of monthly ownership is within a monthly transportation budget of the user includes one of a symbol indicating that the total cost of monthly ownership is within the monthly transportation budget of the user and a different symbol indicating that the total cost of monthly ownership is not within the monthly transportation budget of the user.

20. The computer-implemented method of claim 19, wherein the symbol indicating that the total cost of monthly ownership is within the monthly transportation budget of the user includes a checkmark and the different symbol indicating that the total cost of monthly ownership is not within the monthly transportation budget of the user includes an X.

\* \* \* \* \*